April 21, 1936.  J. A. JAMESON  2,038,430
PHOTOGRAPHIC PRINTING APPARATUS
Filed June 10, 1933  2 Sheets-Sheet 2
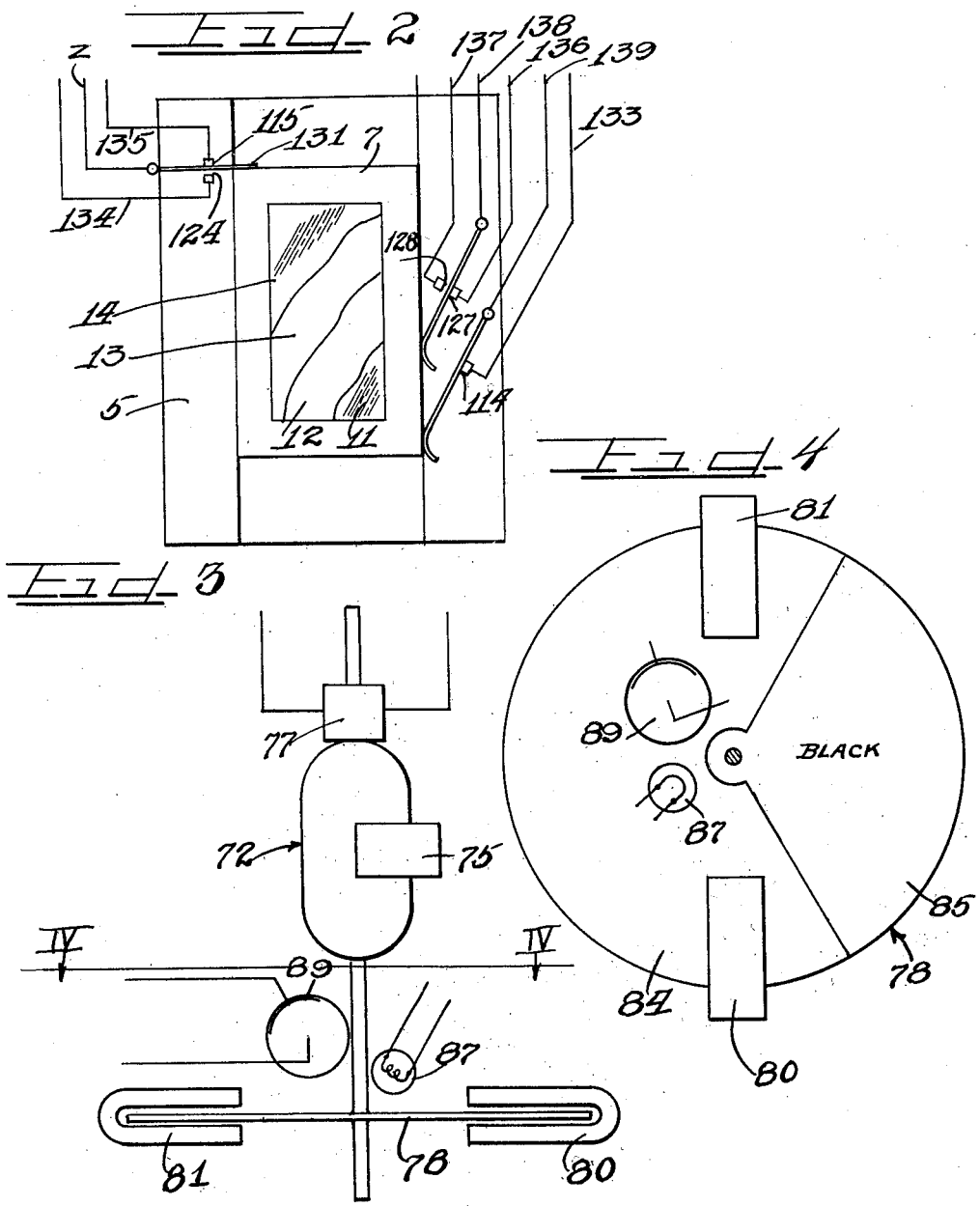
Inventor
John A. Jameson Patented Apr. 21, 1936

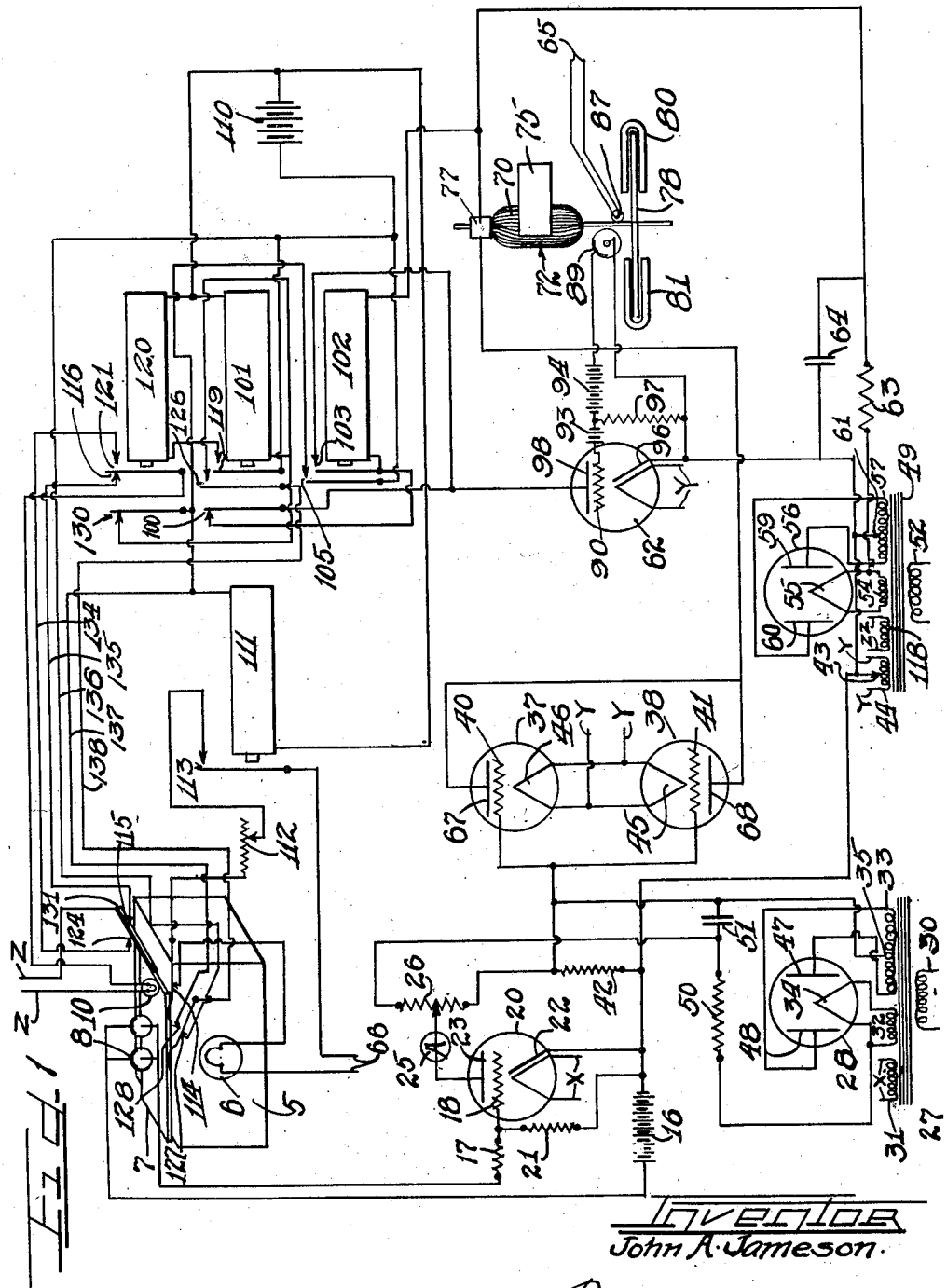

2,038,430

UNITED STATES PATENT OFFICE 2,038,430

PHOTOGRAPHIC PRINTING APPARATUS

John A. Jameson, Canton, Ill., assignor of one-fifth to Walter C. Sadler, Ann Arbor, Mich.

Application June 10, 1933, Serial No. 675,184

14 Claims. (Cl. 95—73)

This invention relates to a photographic printing apparatus which provides automatic regulation of the length of each exposure whereby greater uniformity is secured in the quality of the finished prints. Heretofore the process for producing photographic prints from negatives or tracings has been to expose a piece of sensitized paper to light passing through the negative or tracing for a certain period of time, this period of time being proportional to the density of the negative or tracing being used. However, the exact time used has in the past been left to the judgment and experience of each individual operator and great difficulties have been experienced when prints were being made from negatives of widely varying density. My new invention is designed to remove the human equation, or error in judgment of the individual operator as to the length of exposure required, and to provide an apparatus for automatically giving a correct exposure for each individual negative or tracing. This has many advantages over the old manual system, in that the machine is so designed as to always give a good print irrespective of the density of the negative or tracing. As applied to the photographic process, for instance, the machine will turn out two pictures of identical printing results from two films taken under widely different time exposures. This is accomplished automatically without any manual adjustment of my apparatus.

Negatives or tracings vary greatly in their density and a dense negative will require more time to print than a less dense one. A limited amount of the light which passes through the negative during printing will also pass through the sensitized positive. I have found that I may employ the light passing through the sensitized paper to operate a photoelectric cell which will, in turn, allow an electric current to pass which is proportional to the intensity of the light passing through the sensitized paper. I may then employ this electric current to operate a suitable device for stopping the exposure of the negative and positive to the light source after an interval of time is elapsed which is proportional to the density of the original negative.

This device will have a distinct advantage in that it will permit a photographer to take a picture without any particular care or attention to the time of exposure. A photographer may even use a camera the shutter of which has but one instantaneous exposure, and obtain satisfactory pictures for all ordinary light intensities if he uses my device for printing the positives.

It is, then, an object of this invention to provide an automatic photographic printing apparatus in which the length of the exposure of the sensitized paper to the light source is proportional to the density of the negative.

It is also an object of this invention to provide a photographic printing appparatus which will automatically print pictures of a uniform density irrespective of the density of the negative or tracing used.

Other and further objects of this invention will be evident from the following specification and accompanying drawings.

On the drawings:

Figure 1 is a diagram of the electric circuit of my invention, with parts shown diagrammatically.

Figure 2 is a diagrammatic plan view of the top of the lamp house of my device showing a printing frame in position with parts broken away.

Figure 3 is a diagrammatic view of the motor used in my device.

Figure 4 is a section of my motor taken along the lines IV—IV of Figure 3 with parts shown in elevation.

As shown on the drawings:

Reference number 5 indicates a lamp nousing which encloses a lamp 6. A printing frame 7 is slidable across the top of the lamp housing 5 and is adapted to be placed between said lamp 6 and photo-electric cells 8. A small lamp 10 is placed upon the same side of the printing frame 7 as the photo-electric cells 8 for reasons to appear hereinafter. In Figure 2, the printing frame is shown with parts broken away to illustrate the arrangement of the positive and negative therein. A glass plate 11 forms the lower portion of the printing frame 7 and supports a negative 12 in flat position. Above this is a sensitized paper or other sensitized material 13 placed with its sensitive side toward the negative 12. The lamp 10 should either be so small as not to noticeably affect the sensitized photographic material being used, or should be so located that its light will not strike said material directly. Above this a glass plate 14 may be placed to cause the negative and sensitized paper to lie flat.

The operation of the device will now be explained together with a description of the several parts. It is assumed that a negative and positive have been placed in position as described above, and that the small lamp 10 is lighted. At this point the lamp 6 is dark. At soon as the printing frame is placed in position lamp 10 is turned on by the closing of contacts 115 and the resulting light affects the photo-electric cells 8. In response to this light, the photo-electric cells 8 pass a small amount of current supplied by a "B" battery 16. This current after passing the cells 8, passes through resistance 17 to a grid 18 in vacuum tube 20. The grid leak 21 which connects the grid 18 with the positive side of battery 16 completes the grid circuit, permitting the current from the photo-electric cells 8 to pass from grid 18 to the negative side of the battery 16 but is of sufficiently high resistance so that grid 18 is maintained at a negative potential with respect to the positive side of said battery and cathode 22 of tube 20, which is connected thereto.

The negative potential thus set up in grid 18 acts to decrease the flow of the plate current to tube 20. This plate circuit will now be traced. Starting with the flow of electrons from cathode member 22 of tube 20 to plate member 23, the electron flow passes through ammeter 25 to an adjustable potentiometer 26. Potentiometer 26 is connected directly across the "B" supply for the plate circuit of tube 20 and permits a wide range of adjustment of the positive potential on plate 23.

The B battery current for tube 20 is supplied by a rectifying device comprising transformer 27 and rectifying tube 28. Alternating current is supplied to a coil 30 of transformer 27 and alternating current is thereby induced into windings 31, 32 and 33 of transformer 27. The leads X from winding 31 are connected to the filament leads X of tube 20 thereby supplying current to the filament of tube 20. The winding 32 supplies current to heat filament 34 of tube 28. The source of plate current is the winding 33, which has a center tap 35, which is the negative side of the plate supply for the tube 20 and also of the grid supply of power tubes 37 and 38 which are connected in parallel. Tap 35 is connected directly to grid elements 40 and 41 of tubes 37 and 38 and to one end of a grid leak or resistance element 42, the opposite end of which is connected to a tap 43 on the mid-point of winding 44 of transformer 49. Leads YY of winding 44 are connected directly to leads YY of filaments 45 and 46 of tubes 37 and 38. Grid elements 40 and 41 are also connected directly to one side of a potentiometer 26 the other side of which is connected to the filament 34 of tube 28 containing plates 47 and 48 each of which is connected to one end of the winding 33.

The plate 23 of the tube 20 is adjustably connected to a point on potentiometer 26. This permits a portion of the negative potential to flow through resistance 42 to cathode 22 of tube 20, pass across to the plate 23 and back to the positive side of the circuit through ammeter 25 and potentiometer 26. Thus it will be seen that the grids 40 and 41 of tubes 37 and 38 will be negative with respect to the filaments of said tubes by an amount which will vary directly with the amount of current flowing in the plate circuit of tube 20 and inversely as the charge on grid 18 of tube 20. Inductance 50 and condenser 51 are for the purpose of smoothing out the pulsations of the rectified current from tube 28 and transformer 27.

Transformer 49 has a primary winding 52 which is connected to any suitable source of alternating current. Secondary winding 54 supplies current to heat filament 55 of the rectifying tube 56 containing plate elements 59 and 60 which are connected to the terminals of secondary winding 57. The function of the tube 56 is to rectify the current from secondary winding 57 to provide a source of plate current for tubes 37, 38 and 62. Inductance 63 and condenser 64 smooth out the pulsations of this rectified current.

Thus it will be seen that when light from lamp 10 is reflected into photo-electric cells 8 the negative potential on grids 40 and 41 of tubes 37 and 38 is decreased thus permitting more plate current to flow in the plate circuit of these tubes. Starting with plates 67 and 68 of tubes 37 and 38 the electron flow passes through commutator 77 and armature windings 70 of motor 72 and then to filament 55 of tube 56 from which it passes to the plates 59 and 60 and to the secondary winding 57 of transformer 49. The midpoint 61 of winding 57 is connected to the midpoint of winding 44 thereby completing the circuit. Since lamp 10 is very small, only a slow motion of the rotation of the armature of motor 72 will take place.

Motor 72 comprises a permanent magnet 75 and a rotor element comprising a commutator 77, windings 70 and a metallic disk 78. Disk 78 cooperates with permanent magnets 80 and 81 to provide a drag to slow up the speed of the motor 72. I find that the magnetic drag thus provided is very advantageous in that it produces a straight line relationship between the intensity of light entering photo-electric cells 8 and the speed of the armature of motor 72.

The metal disk is light colored over a portion 84 of its surface and darkened over another portion 85. Preferably the black portion 85 covers about 120° of the circumference of the disk as shown the remainder being white but this proportion is not critical and may be varied if desired.

Lamp 87 is placed on one side of disk 78 and is connected to any suitable source of current by means of leads 65. Photo-electric cell 89 is so placed that light from lamp 87 will be reflected into it from disk 78. However, no appreciable reflection will occur except from the light portion of the disk so that during the passage of the black portion under the lamp 87, cell 89 will not be effected. For reasons to appear hereinafter the black portion will always appear under lamp 87 at the time frame 7 is placed in printing position on the lamp house 5.

The cell 89 is connected to the grid 90 of tube 62 through a battery 93 and a battery 94. The positive poles of batteries 93 and 94 are both connected to the cathode 96 of tube 62 through resistance 97. Battery 93 is smaller than 94 and has its negative pole connected to grid 90 so that a negative potential is ordinarily imposed upon grid 90. However battery 94 and photo-electric cell 89 are connected in series across resistance 97 so that when current can pass through the cell 89 the potential of the larger battery 94 will decrease the effect of battery 93, reducing the negative charge on grid 90 and permitting more current to pass through the plate circuit of tube 91. In other words, when light enters cells 8, the motor 72 starts and continues to turn slowly until the light portion of disk 78 comes under lamp 87 at which time the plate current of tube 62 will be greatly increased.

The effect of this increase in plate current will now be noted. Starting with plate 98 of tube 62 the electron flow passes to contacts 100 of relay 101 which are in closed position at this time and then through relay 102 from which it goes back to the filament 55 of tube 56 and thence to plate elements 59 and 60 and back to cathode element 96 of tube 62. When the light portion of disk 78 is under lamp 87 this current will be sufficient to operate relay 102. This closes contacts 103 which permits the current to flow in relay 102 independently of whether contacts 100 are open or closed. The operation of relay 102 also closes contacts 105 which closes a circuit including relay 101 and battery 110. The operation of relay 101 opens contacts 100 but relay 102 is not affected thereby because of the previous closing of contacts 103. The closing of contact 105 also closes a circuit including battery 110 and relay 111. This closes relay 111 completing the circuit through lamp 6, adjustable resistance 112, contacts 113 and 114 causing lamp 6 to light. Thus it will be seen that when the printing frame 7 is placed in position as explained above, disk moves until the white portion 84 comes under lamp 87 whereupon lamp 6 will light and continue to be lighted as long as white portion 84 is under lamp 87. The contact 114 is for the purpose of opening the circuit of lamp 6 so that no current will pass when frame 7 is not in position regardless of the position of disk 78.

When slide 7 was first placed in position contacts 115 were closed thereby closing a circuit including lamp 10, contacts 115, 116, leads ZZ which are attached to the similarly labeled leads ZZ from winding 118 of transformer 49. Any other suitable source of current may be used. As soon as lamp 6 lights, lamp 10 is extinguished, by an action about to be described.

When relay 101 acts contacts 119 are closed, closing a circuit including relay 120 and battery 110. The action of this relay opens contacts 116, thus opening the circuit including lamp 10.

Thus it will be seen that when frame 7 is inserted, the lamp 10 is lighted and disk 78 turns slowly until the white portion 84 comes below light 87 causing relay 102 to close as well as 101, 111, and 120 by virtue of the action of tube 62. This results in the extinguishing of lamp 10 and the lighting of lamp 6, at which time the exposure of the sensitized material 13 begins. This exposure continues while white portion 84 is passing under the lamp 87. As stated above the speed of disk 78 will vary directly as the intensity of the light passing through negative 12 and sensitized paper 13 so that the white portion 84 will be longer in passing lamp 87 when the negative is dense than when it is more transparent. How the exposure is terminated when the white portion 84 has passed lamp 87 will now be explained.

As soon as the dark portion 85 is under lamp 87, only an insignificant amount of light strikes photo-electric cell 89. This decreases the current passed by photo-electric cell 89, which in turn decreases the amount of positive potential between cathode 96 and grid 90, grid element 90 again becomes negative from the action of battery 93 and the plate current of tube 62 is greatly decreased, so that contacts 103 and 105 of relay 102 are opened. The opening of contacts 105 breaks the circuit through relay 111 which in turn causes contacts 113 to open, extinguishing lamp 6 and terminating the exposure.

The opening of contacts 105 will not cause relay 101 to act because its circuit is closed by contacts 126 and 127 independently of contacts 105. This causes lamp 10 to remain off independently of the position of disk 78. Since relay 101 remains closed contacts 100 will remain open so that lamp 6 remains off independently of the position of disk 78.

When the black portion 85 of disk 78 passes under lamp 87, two situations may arise. First if motor 72 were moving but slowly, it will stop quickly and the black portion 85 will remain under lamp 87. The operation of the device in this case has already been explained. Both lamps 6 and 10 go off and remain off. However, if motor 72 were turning rapidly the black portion 85 may move past lamp 87 so that the white portion 84 will be under the lamp. The operation of the device when this occurs will now be explained.

When the black portion 85 passes under light 87 relay 102 opens as explained above. This opens contacts 105 and 103. However, relay 101 is not affected thereby because its circuit is kept closed by contacts 126. This keeps contacts 100 open so that no current can pass in the circuit of relay 102, and contacts 105 which control the lighting of bulb 6 through relay 111 cannot again be closed.

This situation continues until frame 7 is removed at which time the circuit of relay 101 is opened at contacts 127 so that relay 101 is released which opens contacts 119 releasing relay 120. As soon as relay 101 is released, contacts 100 close, and, since the white portion 84 is under lamp 87, the plate circuit of tube 62 is closed through relay 102. This closes contacts 105 which causes current from battery 110 to flow through contacts 105, relay 101, and contacts 130 back to battery 110 thereby closing the circuit through relay 101 which in turn opens contacts 100. However, the circuit passing through 100 is kept closed by contacts 103 which are closed by the operation relay 102. The operation of relay 101 closes contacts 119 thereby operating relay 120 which opens contacts 130. This however does not release the relay 101 since contacts 126 have closed and current may pass from battery 110 through relay 101, contacts 126 and 128 back to battery 110 thereby keeping relay 101 closed. The relay 120 remains on thereby closing contacts 121. Since contacts 124 were closed when frame 7 was withdrawn, current may now flow in the circuit through contacts 121 and 124 causing lamp 10 to light.

The lighting of lamp 10 will affect photo-electric cells 8 causing the disk 78 to rotate slowly in the manner already described above until the black portion 85 is under the lamp 87 at which point the plate current in tube 62 is reduced in a manner which has been described above and relay 102 is released. Contacts 105 are thereby opened and since during this operation contacts 105 have been included in the circuit of relay 101, this relay is immediately released. The release of the relay 101 opens contacts 119 which in turn releases relay 120. This results in the opening of contacts 121 which extinguishes lamp 10. Lamp 6 has remained off during this time because its circuit was opened at contacts 114 when frame 7 was removed. Thus it will be seen that the apparatus has been returned to the original condition at the time frame 7 was first inserted. When frame 7 is again inserted it will contact bar 131, and close contacts 115 lighting lamp 10 and the above cycle will be repeated.

It will be understood that windings 30 and 52 are connected to a suitable source of alternating current and that leads 65 and 66 may be connected to any suitable current, either direct or alternating.

The connections passing from lamp house 5 to relays 101, 102, 111, and 120 in Figure 1 have been designated 133, 134, 135, 136, 137, 138, and 139 to identify them with the connections shown on Figure 2.

While I have shown the use of two magnets, 80 and 81, to provide a drag on disk 78, it will be understood that this number is not critical and that more may be used if desired. Other suitable means for retarding the speed of the motor 72 so as to establish a straight line relationship between the current input and the speed of the motor may be used to replace magnets 80 and 81.

When setting up my apparatus it is necessary to adjust it to provide the proper exposure for the particular grade of sensitized paper or other sensitized material used. The milliammeter 25 and the potentiometer 26 in the plate circuit of tube 20 is provided for this purpose. Potentiometer 26 is adjusted until a point is reached at which my machine gives an adequate exposure for the grade of paper being used, and the reading of the milliammeter is taken. After this, it is only necessary to set the potentiometer to the point where the milliammeter shows the reading which gives satisfactory results for that particular grade of paper and the machine may be operated using that paper and any desired negative with no additional adjustment. If desired the milliammeter may be supplied with a scale calibrated to show the best reading for each grade of sensitized material to be used. If this is done very rapid changes may be made from one type of material to another without sacrificing any of the automatic features of the machine.

Resistance 112 may also be used to adjust my device for different grades of paper. This resistance is particularly useful for keeping the potential across lamp 6 constant.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a photographic printing apparatus, a light source, means for securing the negative and positive in position to receive light emanating from said source, an exciter light circuit, light sensitive means affected by said exciter light, an electric circuit including said light sensitive means, reflecting means movable by the flow of current in said circuit, a control circuit for the light source, a second light sensitive means in said circuit affected by light from said reflecting means for connecting said light source and for disconnecting said light source when the reflecting means have moved a predetermined amount, the speed of movement of said reflecting means being dependent upon the quantity of light transmitted through the negative.

2. In a photographic printing apparatus comprising a light source, light sensitive means, means, means for supporting photographic film material between said light source and said sensitive means, amplifying means for amplifying the electric impulses from said light sensitive means, and motor means associated with said amplifying means, said motor means rotating in response to and with a speed varying with the intensity of said impulses, reflecting means associated with said motor, a second source of light and a second light sensitive means associated with said reflector means to receive reflected light from said second light source and means associated with said second light source to extinguish the light at the first mentioned light source when reflected light is cut off from said second light sensitive means by said reflector.

3. A photographic printing apparatus comprising means for holding a sensitized material and a transparent material containing an image to be reproduced, a light source to expose said sensitized material through said transparent material, light sensitive means reactive to light passing through said sensitized material and transparent material, amplifying means associated with said light sensitive means, a rotor carrying a reflector the rotation of said rotor being controlled by said amplifying means, a second light sensitive means affected by light reflected from said reflector, said second light sensitive means controlling means for disconnecting said light source after a predetermined amount of light has passed through said transparent material.

4. A photographic printing apparatus comprising holding means for supporting a sensitized material and a transparent material containing an image to be reproduced, a light source adapted to expose said sensitized material through said transparent material, light sensitive means affected by light passing through said sensitized material and transparent material, amplifying means associated with said light sensitive means, a rotor element carrying a reflector, the rotation of said rotor element being controlled by said amplifier, a magnetic drag associated with said rotor element, a second light sensitive means reactive to light reflected from said reflector, a relay operated by said second light sensitive means, said light source being controlled by said relay.

5. A photographic printing apparatus comprising holding means for supporting a sensitized material, and a transparent material containing an image to be reproduced, to expose said sensitized material through said transparent material, light sensitive means affected by a light passing through said sensitized material and transparent material, amplifying means associated with said light sensitive means, a rotor element being controlled by said amplifier, a magnetic drag associated with said rotor element, a second light sensitive means reactive to light reflected from said reflector, a holding relay operated by said second light sensitive means, contacts on said holding relay connected with means for connecting said light source, said holding relay operating a second holding relay operating a third relay, a second light source above said holding means operated by said third relay, contacts associated with said holding means whereby said second holding relay holds independently of said first holding relay when said holding means is in position but holds only as long as said first relay holds when said holding means is not in position and other contacts on said holding means, said controlling second light source and contacts on said third relay associated therewith whereby said second light source is on only when said holding means is in position and said second relay not holding or when said holding means is removed and said second relay is holding.

6. In a photographic printing apparatus, a light source, means for positioning a negative and sensitized material to receive light emanating from said source, light sensitive means affected by light passing through the negative, a motor in circuit with said light sensitive means and means dependent on the speed of the motor for controlling the time of exposure of the negative and sensitized means to said light source, and a magnetic drag associated with said motor whereby a straight line relationship is established between the speed of said motor and the intensity of light passing through the negative from said light source.

7. A photographic printing apparatus comprising a light source, means for positioning a negative and sensitized material to receive light emanating from said source, light sensitive means affected by the light passing through the negative, a motor including an armature in circuit with said light sensitive means, a relay, the opening and closing of which is dependent on the position of said armature, said relay controlling the circuit including said light source, and controlling a second circuit including an exciter lamp over said means for positioning a negative, and contact means associated with said means for positioning a negative, whereby said motor is returned to an initial position.

8. A photographic printing apparatus comprising holding means for supporting a sensitized material, and a transparent material containing an image to be reproduced, to expose said sensitized material through said transparent material, light sensitive means affected by light passing through said sensitized material and transparent material, amplifying means associated with said light sensitive means, a rotor element carrying a reflector controlled by said amplifier, a second light sensitive means reactive to light reflected from said reflector, a holding relay operated by said second light sensitive means, contacts on said holding relay connected with means for connecting said light source, said holding relay operating a second holding relay operating a third relay, a second light source above said holding means operated by said third relay, contacts associated with said holding means whereby said second holding relay holds independently of said first holding relay when said holding means is in position but holds only as long as said first relay holds when said holding means is not in position and other contacts on said holding means controlling said second light source and contacts on said third relay associated therewith whereby said second light source is on only when said holding means is in position and said second relay not holding or when said holding means is removed and said second relay is holding.

9. In a photographic printing apparatus, means for positioning a negative and sensitized material to be exposed to light passing therethrough, a light source, and movable reflecting means for connecting the light source and for disconnecting the same after a predetermined time dependent on the amount of light passed through the negative from the light source, and means for setting said reflecting means in motion when the negative is placed in position.

10. In a photographic printing apparatus, means for positioning a negative and sensitized material to be exposed to light passing therethrough, a light source, and movable reflecting means for connecting the light source and for disconnecting the same after a predetermined time dependent upon the amount of light passed through the negative from the light source and means for returning said reflecting means to its initial position.

11. In a photographic printing apparatus, means for positioning a negative and sensitized material to be exposed to light passing therethrough, a light source, light sensitive means positioned to intercept light passing through said sensitized material, rotary timing means connected to said light source, means to transmit impulses from said light sensitive means to said timing means, means to establish a linear relationship between the intensity of the impulses of said light sensitive means and the period of illumination of said light source, means for starting said timing means when said negative and sensitized materials are placed in position and means for continuing the rotation of the timing means for resetting said timing means when the exposure has been completed.

12. In a photographic printing apparatus, means for positioning a negative and sensitized material being exposed to light passing through said negative, a light source positioned to direct light through said negative and sensitized material, light sensitive means responsive to light passing through said negative and sensitized material, a movable reflecting means controlled by said light sensitive means and means cooperating with said reflecting means to interrupt the light from said light source after a predetermined quantum of light has passed through said negative and said light sensitive material.

13. In a photographic printing apparatus, a light source, means for securing a negative and a positive in position to receive light emanating from said source, means sensitive to light passing through said positive, motor means cooperating with said light sensitive means adapted to turn with a speed proportional to the intensity of light falling on said light sensitive means, relay means cooperating with said motor means adapted to cut off light from said source after a time inversely proportional to the speed of said motor means, and to continue the rotation of said motor means to an initial position.

14. In a photographic printing apparatus, means for holding a positive and a negative in juxtaposition, a light source adapted to supply light to pass through said negative and affect said positive, a second light source adapted to provide light to reflect from said positive without passing therethrough, light sensitive means positioned to receive light passing through or reflected from said positive, motor means associated with said light sensitive means and adapted to run with a speed proportional to the intensity of light affecting said light sensitive means, relay means associated with said motor adapted to close the circuit of said second light source until said motor has turned to a predetermined initial position and to thereupon open said circuit and close the circuit of said first mentioned light source and thereafter to open said second mentioned circuit when said motor has reached a predetermined final position.

JOHN A. JAMESON.